US010377280B2

United States Patent
Akaike et al.

(10) Patent No.: US 10,377,280 B2
(45) Date of Patent: Aug. 13, 2019

(54) VEHICLE SEAT (71) Applicant: TOYOTA BOSHOKU KABUSHIKI KAISHA, Aichi-ken (JP)

(72) Inventors: Fumitoshi Akaike, Aichi-ken (JP); Hiroshi Mizobata, Aichi-ken (JP); Hisato Konai, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 62 days.

(21) Appl. No.: 15/498,823

(22) Filed: Apr. 27, 2017

(65) Prior Publication Data
US 2017/0313224 A1 Nov. 2, 2017

(30) Foreign Application Priority Data

Apr. 28, 2016 (JP) .................................. 2016-090906

(51) Int. Cl.
B60N 2/68 (2006.01)
(52) U.S. Cl.
CPC ...................................... B60N 2/68 (2013.01)
(58) Field of Classification Search
CPC ....................................................... B60N 2/68
USPC .... 297/452.18, 452.2, 440.22, 216.13, 440.2
See application file for complete search history.

(56) References Cited

U.S. PATENT DOCUMENTS

| 2011/0163587 A1* | 7/2011 | Kmeid | ..................... B60N 2/68 297/452.2 |
| 2015/0343930 A1* | 12/2015 | Yokoyama | ............... B60N 2/68 297/316 |

FOREIGN PATENT DOCUMENTS

JP 2015-101286 6/2015

* cited by examiner

Primary Examiner — Syed A Islam
(74) Attorney, Agent, or Firm — Greenblum & Bernstein, P.L.C.

(57) ABSTRACT

A vehicle seat includes: a seat frame that is provided as a strength member and extends in a specific direction, the seat frame including: a closed section frame having a closed sectional shape and extending in the specific direction, an opened section frame having an opened sectional shape and extending in the specific direction in parallel with the closed section frame, wherein the opened section frame is coupled with the closed section in a state to have a closure forming part and a gradually changing structure, wherein the closure forming part forms a closed sectional shape between the opened section frame and the closed section frame, and wherein the gradually changing structure changes the closed sectional shape formed between the opened section frame and the closed section frame at the closure forming part.

19 Claims, 10 Drawing Sheets

FIG.12

VEHICLE SEAT

CROSS-REFERENCE TO RELATED APPLICATION

This application claims priorities from Japanese Patent Application No. 2016-090906 filed on Apr. 28, 2016, the entire subject matters of which is incorporated herein by reference.

TECHNICAL FIELD

The present disclosure relates to a vehicle seat, and particularly to a vehicle seat including a seat frame as a strength member extending in a specific direction.

BACKGROUND

In the related art, there is known a vehicle seat in which a seat frame is formed in a closed sectional shape with a constant lateral sectional shape by extrusion-molding an aluminum material (see, for example, JP-A-2015-101286). In the seat frame of the closed sectional shape, reduction holes which make an opened section in plural positions are formed to optimize a balance between structure strength and weight.

In the configuration in which a portion of the seat frame with the closed sectional shape has a reduction hole similarly to the conventional structure, a section modulus is rapidly changed so that a stress concentration may easily occur.

SUMMARY

The present disclosure is made in consideration of the above-mentioned circumstances, and one of objects of the present disclosure is to provide a vehicle seat in which balance between structure strength and weight of a seat frame are more effectively optimized.

According to an illustrative embodiment of the present disclosure, there is provided a vehicle seat including: a seat frame that is provided as a strength member and extends in a specific direction, the seat frame including: a closed section frame having a closed sectional shape and extending in the specific direction, an opened section frame having an opened sectional shape and extending in the specific direction in parallel with the closed section frame, wherein the opened section frame is coupled with the closed section in a state to have a closure forming part and a gradually changing structure, wherein the closure forming part forms a closed sectional shape between the opened section frame and the closed section frame, and wherein the gradually changing structure changes the closed sectional shape formed between the opened section frame and the closed section frame at the closure forming part.

DETAILED DESCRIPTION

Hereinafter, an embodiment of the invention will be described by referring to the accompanying drawings.

Figure 1:
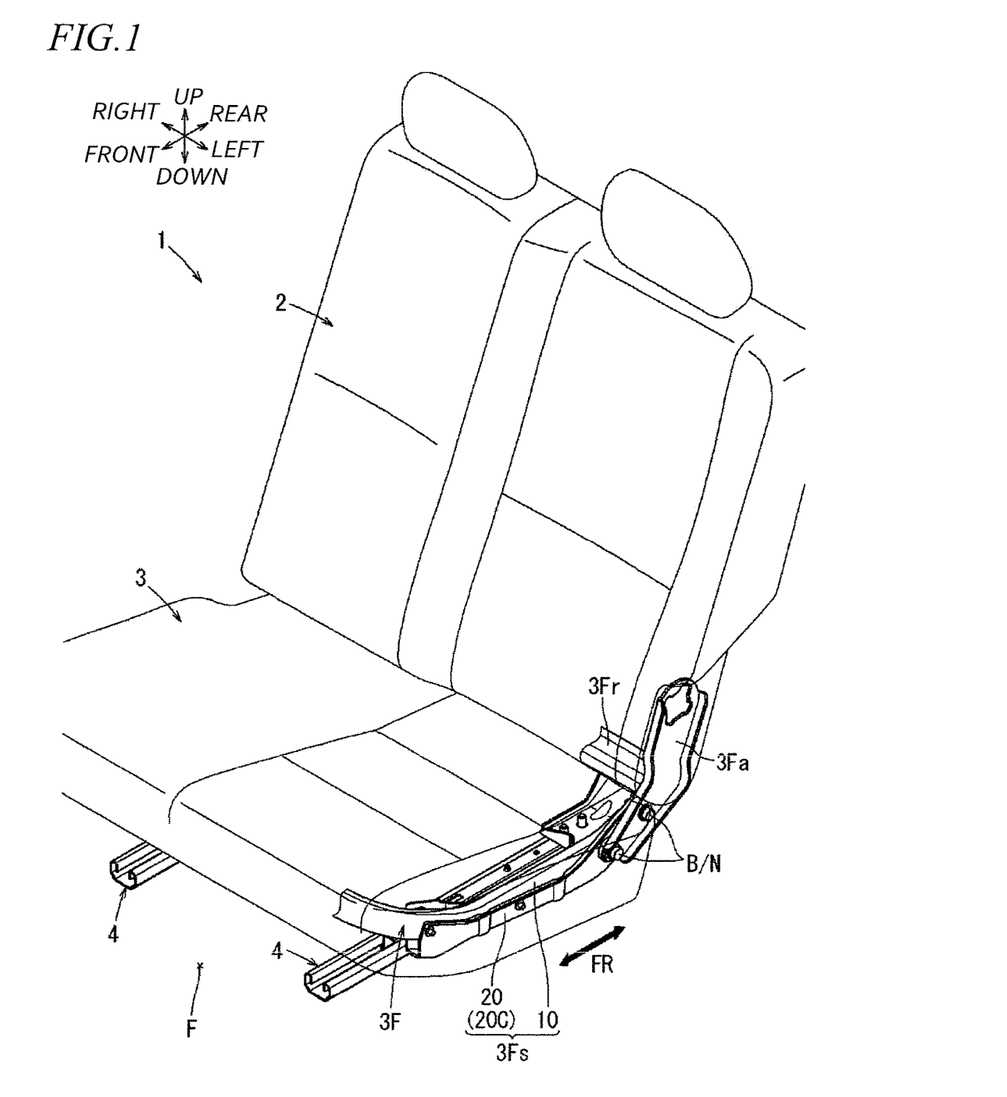
FIG. 1 is a perspective view illustrating a schematic configuration of a vehicle seat of according to a first embodiment.

A configuration of a seat 1 according to a first embodiment will be described with reference to FIGS. 1 to 10. As illustrated in FIG. 1, the seat 1 of this embodiment is configured as a rear-side seat of an automobile and as a so-called bench seat on which two persons can sit on right and left sides. Particularly, the seat 1 is configured as a two-person seat including a left-side seat and a center seat, which can form a three-person seat together with a right-side seat (not illustrated). A dimension ratio of the left-side seat, the center seat, and the right-side seat (not illustrated) in a seat width direction is 4:2:4. That is, the seat 1 is configured as a bench seat on a wide side which is divided with the right-side seat (not illustrated) at 6:4 ratio.

The seat 1 includes a seat back 2 which is a backrest of a seating person and a seat cushion 3 which is a seating part. The seat back 2 is supported by connecting the lower end thereof with the rear end of the seat cushion 3. The seat cushion 3 is configured to be connected on a floor F of the vehicle with a pair of right and left slide rails 4 interposed therebetween.

In an initial state, the seat 1 is held in a state where a position (hereinafter, "a seat position") of the seat 1 on the floor F in a front and rear direction FR is fixed by holding the slide rails 4 in a slide-lock state. The slide-lock state of the slide rails 4 is released all together by an operation of pulling up a lever (not illustrated) provided in the left portion of the seat cushion 3, and the slide rails 4 are switched to be in the state of adjusting the seat position. Then, the slide rails 4 is returned again to be in the slide-lock state by returning the operation of the lever (not illustrated) after the adjustment of the seat position.

In the seat cushion 3, a metal cushion frame 3F forming an inner framework thereof is not illustrated in detail in the drawings, but is configured to be assembled in a substantially square frame shape in a plan view along the outer circumferential shape of the seat cushion 3. As illustrated in FIGS. 2 to 5, in the cushion frame 3F, a side frame 3Fs forming the inner framework along the left portion of the seat cushion 3 is configured in such a manner that a rectangular pipe-shaped closed section frame 10, which extends in a long shape in the front and rear direction FR, and an opened section frame 20, which extends in a long shape in the front and rear direction FR in parallel with the closed section frame 10 in a height direction and has a substantially U-shaped sectional shape, are assembled integrally.

The front piece of the square frame of the cushion frame 3F is formed by an extension area 10D which extends to be bent to the right side from the front portion of the closed section frame 10 forming the side frame 3Fs on the left side. The rear piece of the square frame of the cushion frame 3F is formed by a rear pipe frame 3Fr which is connected with the rear end (a connection part 20D to described later) of the opened section frame 20 forming the side frame 3Fs on the left side and extends to the right side. A plate-shaped lower arm 3Fa which extends in a rear and upper direction is connected with the rear end of the side frame 3Fs on the left side. In the lower arm 3Fa, the seat back 2 in FIG. 1 is connected in a position extending to the rear upper side through a recliner (not illustrated).

Figure 2:
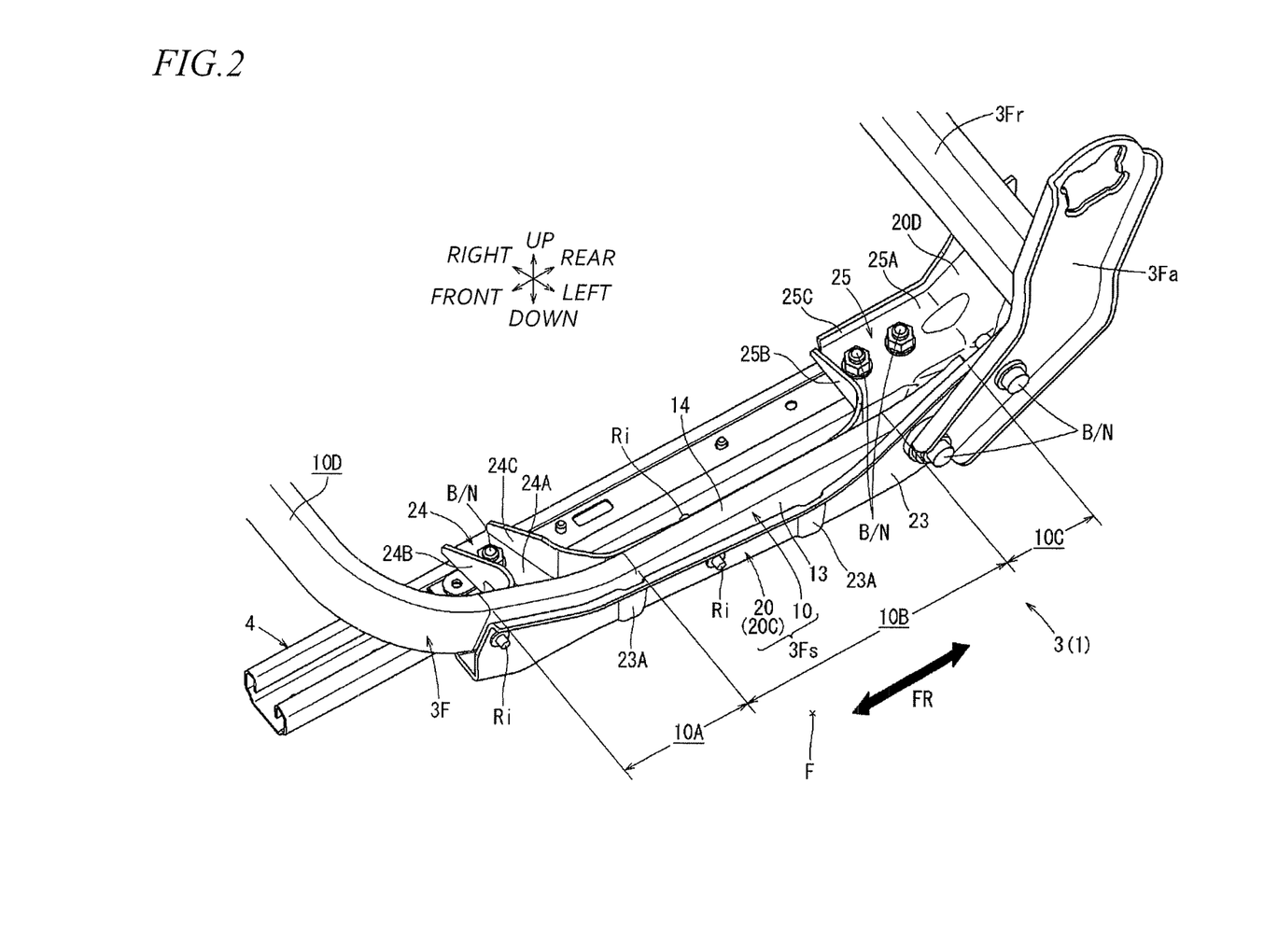
FIG. 2 is a perspective view of an inner structure of a left portion of a seat cushion.
Figure 3:
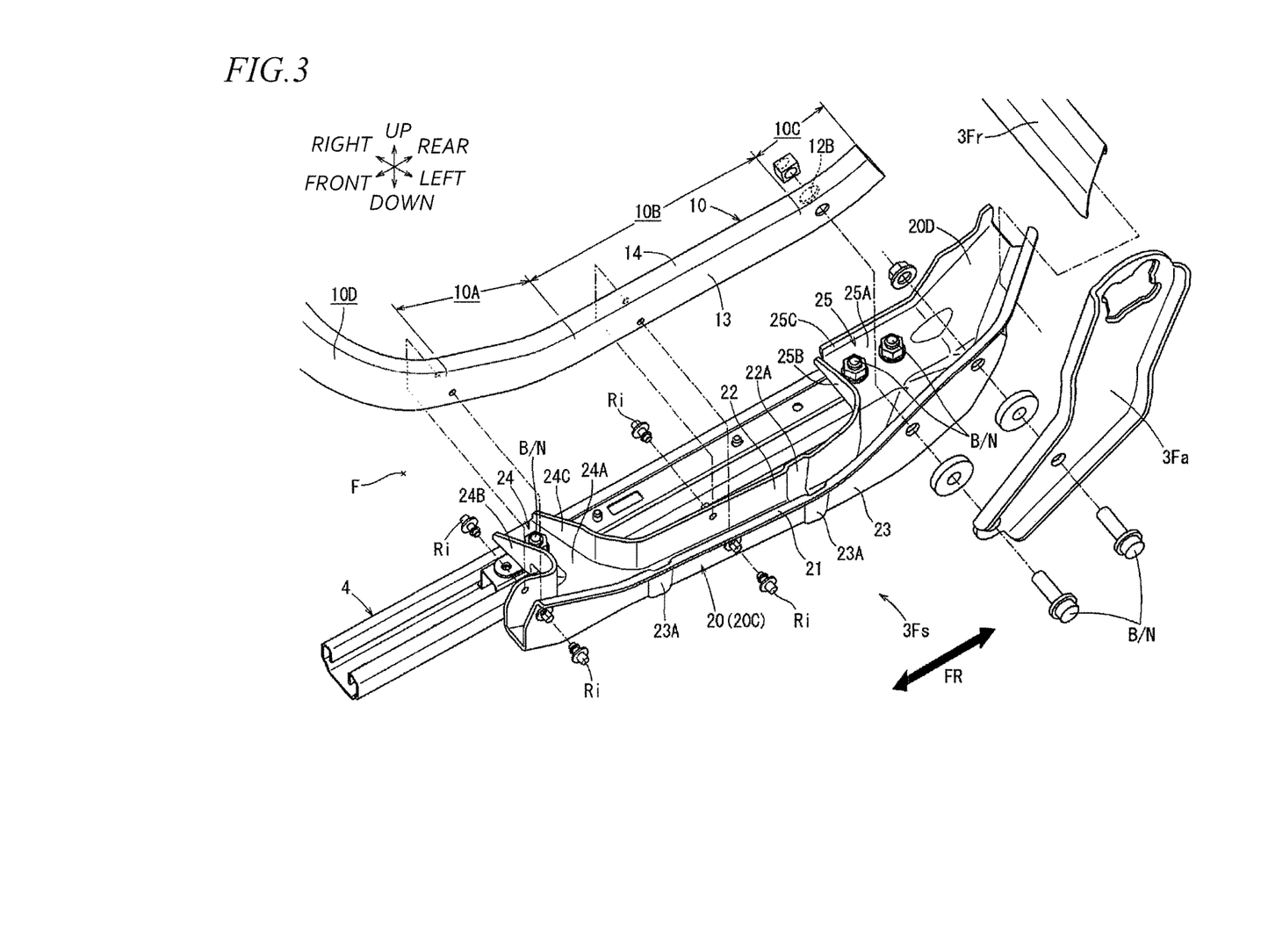
FIG. 3 is an exploded perspective view of the inner structure.
Figure 5:
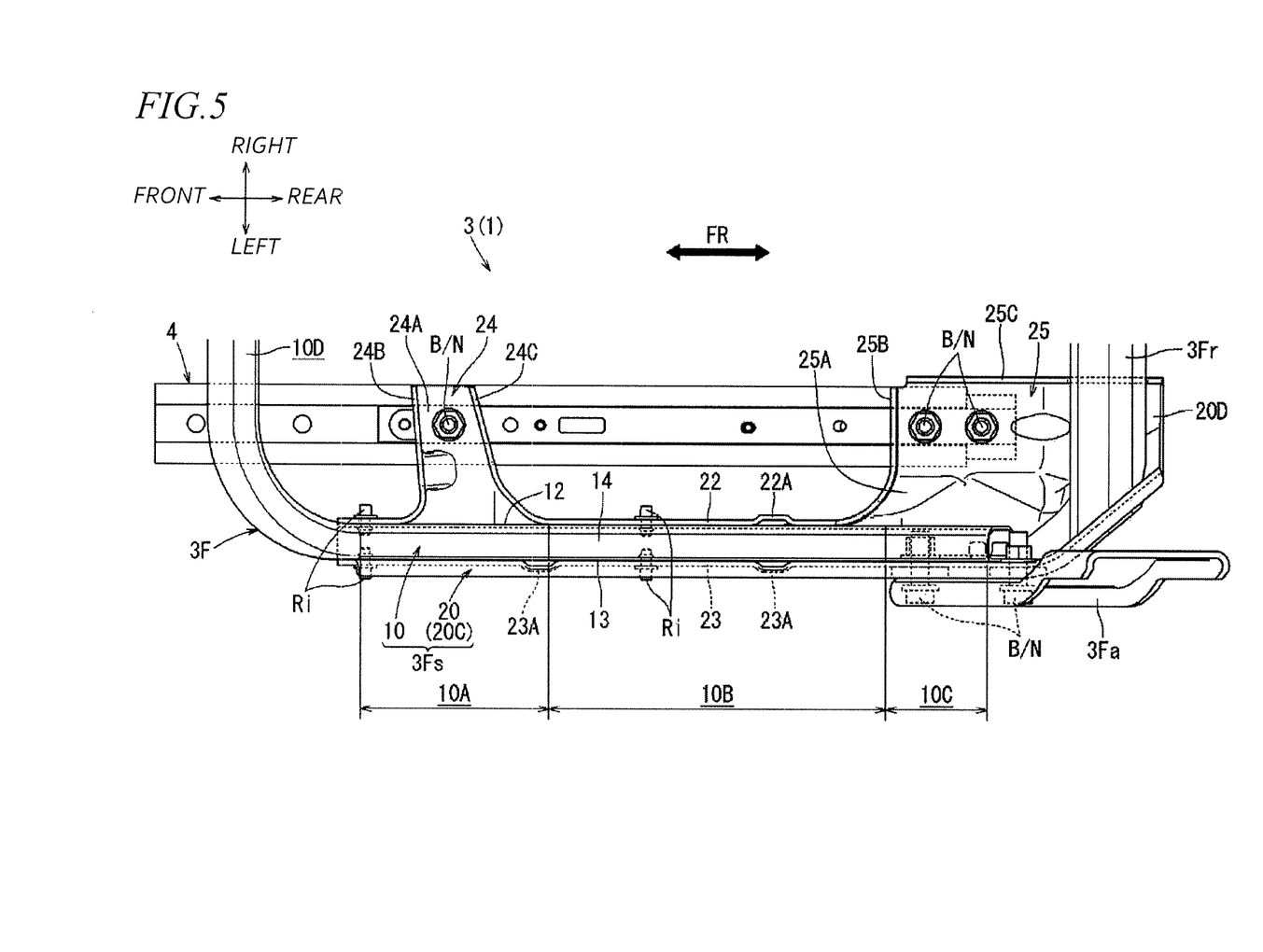
FIG. 5 is a plan view of the inner structure.

As illustrated in FIGS. 2 to 5, the side frame 3Fs on the left side is assembled with the upper portion of the left slide rail 4, and is provided in the state of being supported by the slide rail 4 from below. Specifically, as illustrated in FIGS. 2, 3, and 5, in the side frame 3Fs on the left side, a front mounting part 24 and a rear mounting part 25 formed in two front and rear positions of the opened section frame 20 integrally assembled with the closed section frame 10 are installed on the slide rail 4 to be fixedly fastened integrally to the slide rail 4 by bolt and nut B/N. The front mounting part 24 and the rear mounting part 25 are formed in a shape which partially protrudes to the right side from portions in the two front and rear positions of the opened section frame 20, respectively.

Figure 4:
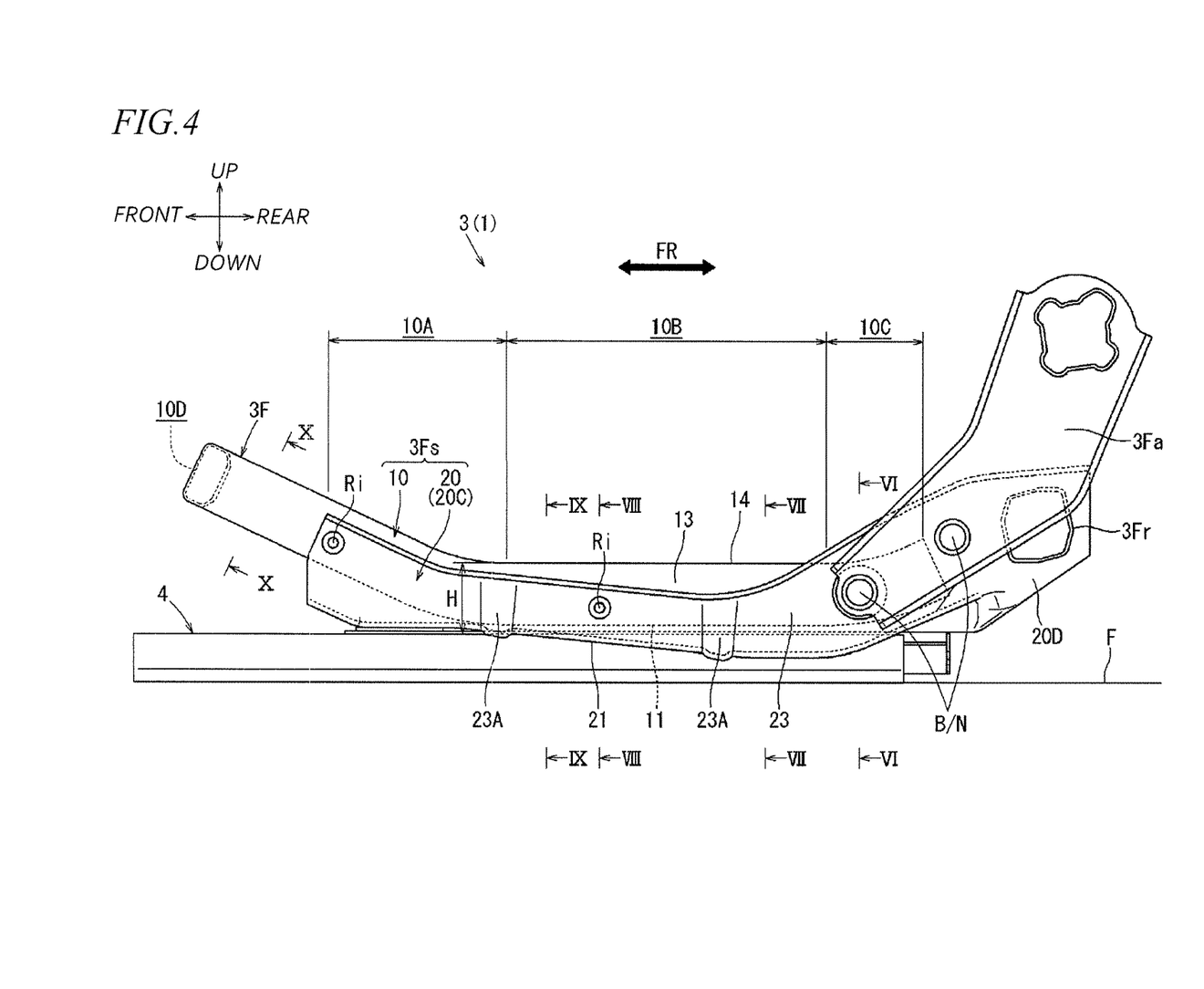
FIG. 4 is a side view of the inner structure.

The closed section frame 10 forming the side frame 3Fs on the left side is formed of a tubular member with a constant closed section obtained by extrusion-molding an aluminum material. After the extrusion-molding, in the closed section frame 10, the extension area 10D on the front end side is bent to the right side. As illustrated in FIG. 4, in the closed section frame 10, an area which forms the side frame 3Fs on the left side and extends in the front and rear direction FR is bent in a shape which has a front rising area 10A straightly extending toward a connecting position with the extension area 10D in a shape of rising forward, a straight area 10B straightly extending to a rear side from the rear end of the front rising area 10A along the upper surface of the slide rail 4, and a rear rising area 10C straightly extending obliquely from the rear end of the straight area 10B in a shape of rising rearward.

The closed section frame 10 has a shape of being bent in plural positions as described above, but the sectional shape itself is formed in all areas to have almost the same substantially-rectangular and vertically-long closed sectional shape (see FIGS. 6 to 10).

Specifically, as illustrated in FIGS. 6 to 10, the closed section frame 10 is formed to have a substantially-rectangular and vertically-long closed sectional shape which has a bottom plate part 11 directed to the lower side, a right plate part 12 which stands from the right edge portion of the bottom plate part 11, a left plate part 13 which stands from the left edge portion of the bottom plate part 11, and a top plate part 14 which links the upper edge portions of the right plate part 12 and the left plate part 13.

On the other hand, as illustrated in FIGS. 2 to 5, the opened section frame 20 is formed of a plate member with an opened section obtained by press-molding an aluminum material. The opened section frame 20 is assembled with the front rising area 10A, the straight area 10B, and the rear rising area 10C of the closed section frame 10 in a shape of being overlapped from below so as to be fixedly fastened integrally from side by a plurality of rivets Ri.

As illustrated in FIG. 3, the opened section frame 20 has a shape with a substantially U-shaped opened sectional shape which extends in a long shape in the front and rear direction FR and schematically has a bottom plate part 21 directed to the upper side, a right plate part 22 which stands from the right edge portion of the bottom plate part 21, and a left plate part 23 which stands from the left edge portion of the bottom plate part 21.

The front mounting part 24 in which the right plate part 22 is partially tilted to the right side to extend in an opened shape is formed in the front-end area of the opened section frame 20. In addition, the rear mounting part 25 in which the right plate part 22 is partially tilted to the right side to extend in an opened shape is formed in the rear-side area of the opened section frame 20. The front mounting part 24 is formed in a shape of protruding to the right side from an area of the opened section frame 20 where the front rising area 10A of the closed section frame 10 is overlapped in the front and rear direction FR.

The rear mounting part 25 is formed in a shape of protruding to the right side from an area of the opened section frame 20 where the rear rising area 10C of the closed section frame 10 is overlapped in the front and rear direction FR.

The front mounting part 24 is formed to have a bottom plate portion 24A with a surface connected to be almost flush with the bottom plate part 21, a front plate portion 24B which stands from the front edge portion of the bottom plate portion 24A, and a rear plate portion 24C which stands from the rear edge portion of the bottom plate portion 24A. The front plate portion 24B and the rear plate portion 24C are formed to have a standing plate shape which stands in a shape of being integrally connected with the right plate part 22.

The rear mounting part 25 is formed to have a bottom plate portion 25A with a surface connected to be almost flush with the bottom plate part 21, a front plate portion 25B which stands from the front edge portion of the bottom plate portion 25A, and a right plate portion 25C which stands from the right edge portion of the bottom plate portion 25A. The front plate portion 25B is formed to have a standing plate shape which stands in a shape of being integrally connected with the right plate part 22.

In the left plate part 23 of the opened section frame 20, beads 23A which are bent to partially bulge to the left side are formed in two front and rear intermediate areas. In addition, also in the right plate part 22 of the opened section frame 20, a bead 22A which is bent to partially bulge to the right side is formed in one intermediate area between the front mounting part 24 and the rear mounting part 25. The beads 23A and 22A function as a member which improves structure strength or rigidity with respect to the bending or torsion of the opened section frame 20.

The opened section frame 20 is assembled with the closed section frame 10 from below as follows to be fastened integrally. First, the opened section frame 20 is assembled with the closed section frame 10 from below to nip the right plate part 22 and the left plate part 23 of the closed section frame 10 from both right and left sides by the right plate part 12 and the left plate part 13. Next, the right plate parts 22 and 12 and the left plate parts 23 and 13, which are overlapped on the right and left sides of the opened section frame 20 and the closed section frame 10 respectively, are each fastened by inserting the rivet Ri from side.

Specifically, as illustrated in FIGS. 3 to 4, the opened section frame 20 is set such that the left plate part 23 is overlapped with the left plate part 13 of each area of the front rising area 10A, the straight area 10B, and the rear rising area 10C of the closed section frame 10. Then, the opened section frame 20 is fastened by inserting the rivet Ri from the left side into each of the front-end position and the almost central position of the left plate part 23 having an overlapped shape with each left plate part 13 of the front rising area 10A and the straight area 10B of the closed section frame 10.

As illustrated in FIG. 3, the opened section frame 20 is set such that the right plate part 22 is overlapped with the right plate part 12 of each area of the front rising area 10A and the straight area 10B of the closed section frame 10. Then, the opened section frame 20 is fastened by inserting the rivet Ri from the right side into each of the front position and the almost central position of the right plate part 22 having an overlapped shape with each right plate part 12 of the front rising area 10A and the straight area 10B of the closed section frame 10.

The opened section frame 20 is set such that the lower arm 3Fa is in surface contact from the left side with a position of the left plate part 23 having an overlapped shape with the left plate part 13 of the rear rising area 10C of the closed section frame 10. The opened section frame 20 is fastened integrally with the lower arm 3Fa and the closed section frame 10 by the bolt and nut B/N fastened by being inserted from the left side to the lower arm 3Fa. Specifically, in the lower arm 3Fa, each of two front and rear portions having an overlapped shape with the left plate part 23 of the opened section frame 20 are fastened integrally with the left plate part 23 of the opened section frame 20 by the bolt and nut B/N.

Figure 6:
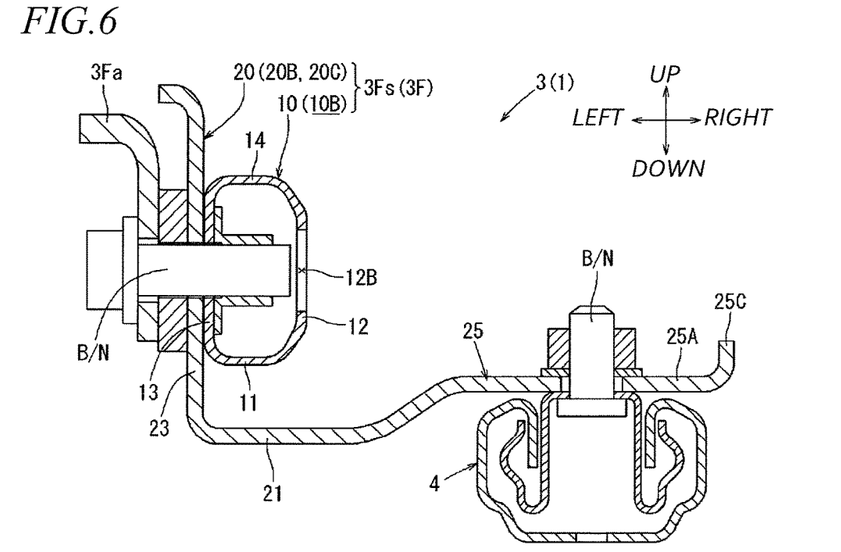
FIG. 6 is a sectional view taken along line VI-VI shown in FIG. 4.

Among the two pairs of the bolt and nut B/N, the bolt and nut B/N fastened on the front side penetrate through and are inserted into the left plate part 13 of the closed section frame 10 having an overlapped shape with the right side of the left plate part 23 of the opened section frame 20 so as to be fastened integrally (see FIG. 6). A round through hole 12B into which the nut penetrates from the right side is formed in a facing position of the right plate part 12 with respect to a position of the closed section frame 10 where the bolt and nut B/N is fastened in the left plate part 13.

As illustrated in FIGS. 2, 3, and 5, the front mounting part 24 and the rear mounting part 25 formed in respective areas of the front and rear side of the opened section frame 20 are installed on the slide rail 4, and the opened section frame 20 is fastened integrally on the slide rail 4 by the bolt and nut B/N. With the configuration, the opened section frame 20 is mounted in the state of supporting the closed section frame 10 from below in a position deviated to the left side from the installation area of the slide rail 4.

As illustrated in FIGS. 6 to 9, particularly, the opened section frame 20 and the closed section frame 10 are mounted in a state where the bottom plate parts 21 and 11 are not overlapped and are separated from each other in the height direction. More particularly, in the front rising area 10A and the straight area 10B of the closed section frame 10 except the rear rising area 10C (see FIG. 4), the opened section frame 20 is mounted in the lower portion of the closed section frame 10 to form a closed sectional shape, which is closed in a substantially rectangular shape, by the U-shaped opened sectional shape and the bottom plate part 11 of the closed section frame 10 (closure forming part 20A: see FIGS. 7 to 9).

With this configuration, a height width H of the entire side frame 3Fs configured by assembling the opened section frame 20 and the closed section frame 10 is enlarged effectively, and thus the structure strength (a sectional secondary moment (section modulus) around a horizontal shaft) of the side frame 3Fs is improved effectively.

More particularly, the opened section frame 20 and the closed section frame 10 described above are assembled such that a separation distance between the bottom plate parts 21 and 11 in the height direction is not constant in the front and rear direction FR in which the side frame 3Fs extends, and is changed in each area. With the configuration, the height width H of the entire side frame 3Fs configured by assembling the opened section frame 20 and the closed section frame 10 is not constant in the front and rear direction FR in which the side frame 3Fs extends, and is changed in each area.

Specifically, the height width H of the side frame 3Fs is changed in each area in the front and rear direction FR as described above by being provided with a gradually changing structure 20C which changes a sectional shape formed by the opened section frame 20 and the closed section frame 10, the sectional shape being formed by mounting the opened section frame 20 in the closed section frame 10 such that the bottom plate parts 21 and 11 form an angle oblique in the height direction.

That is, in the closed section frame 10, the bottom plate part 11 is arranged in the straight area 10B in a direction of extending straightly in the front and rear direction FR, and the bottom plate part 11 is arranged in the front rising area 10A in a direction of extending to be tilted in a shape of rising forward.

On the contrary, in the opened section frame 20, the bottom plate part 21 is arranged in the straight area 10B of the closed section frame 10 in a direction of extending to be tilted in a shape of rising forward, and the bottom plate pail 21 is arranged in the front rising area 10A of the closed section frame 10 in a direction of extending straightly in the front and rear direction FR.

As illustrated in FIG. 4, in the opened section frame 20, a U-shaped opened sectional shape assembled with the closed section frame 10 from below is arranged in a position deviated to the left side from the installation area of the slide rail 4 such that the shape is dropped in until a position of being overlapped with the slide rail 4 in the height direction. With the configuration, in the front and rear areas where the straight area 10B of the closed section frame 10 extends, the side frame 3Fs is formed in a shape in which the height width H is enlarged to increase the structure strength without increasing the shape gradually toward the rear side. Therefore, in an area on a rear portion side in the vicinity immediately below a hip point(not illustrated) where the height width H of the side frame 3Fs is enlarged, a downward load received from a high pressure area such as the buttocks of the seating person can be accepted in a high degree of a suitable rigidity.

In a front and rear areas where the front rising area 10A of the closed section frame 10 extends, the side frame 3Fs can be formed such that the front rising area 10A which stands in a front and upper direction from the straight area 10B of the closed section frame 10 in a cantilever state is supported by the U-shaped closure forming part 20A of the opened section frame 20 to have a shape in which the height width H is wide from below. Therefore, a downward load, which is received by supporting the femoral region of the seating person to be lifted up in an upstanding position (extension area 10D) of the front rising area 10A of the closed section frame 10, can be accepted in a high degree of a suitable rigidity by the configuration in which the height width H of the side frame 3Fs is enlarged to improve the structure strength.

Figure 7:
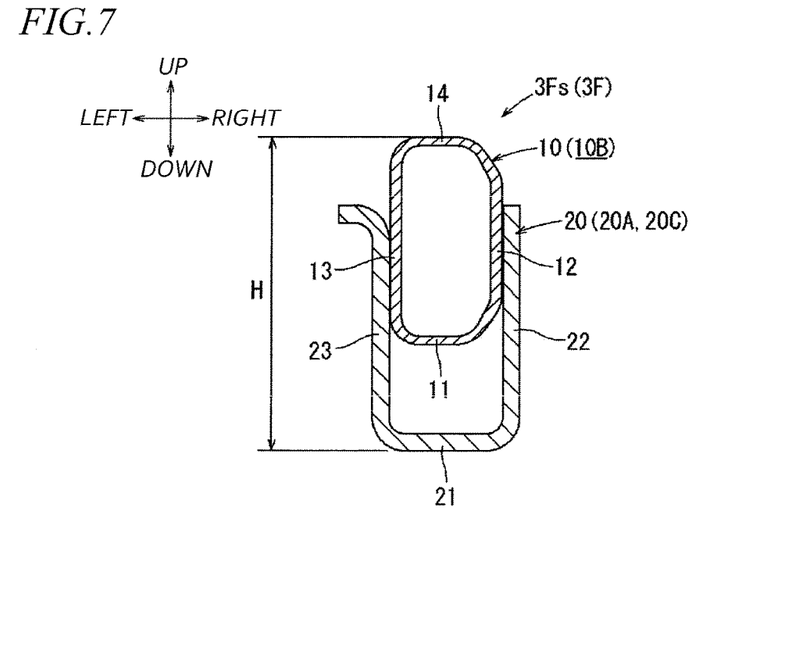
FIG. 7 is a sectional view taken along line VII-VII shown in FIG. 4.
Figure 8:
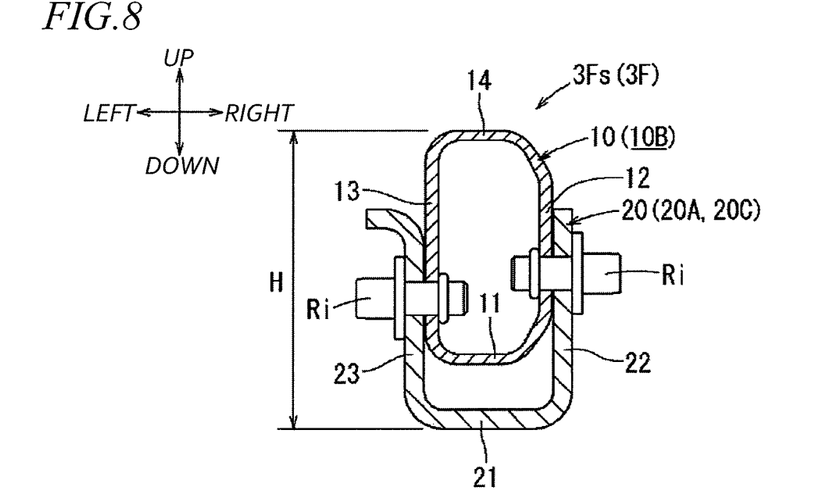
FIG. 8 is a sectional view taken along line VIII-VIII shown in FIG. 4.
Figure 9:
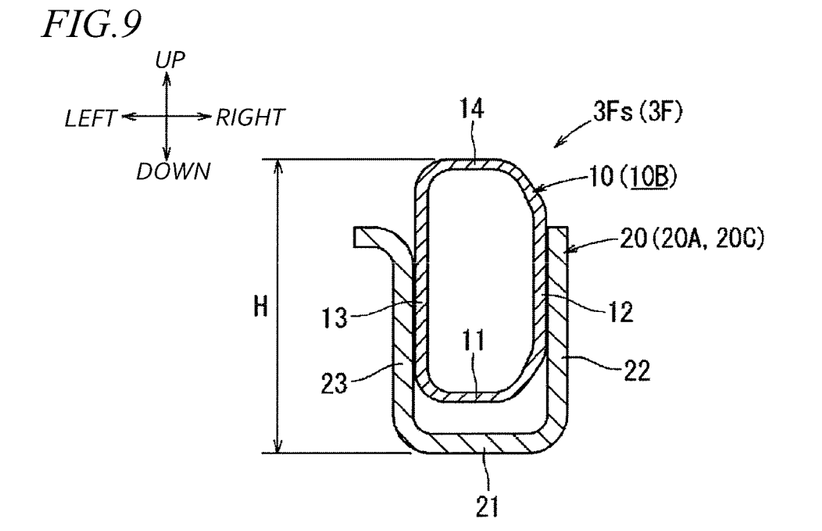
FIG. 9 is a sectional view taken along line IX-IX shown in FIG. 4.
Figure 10:
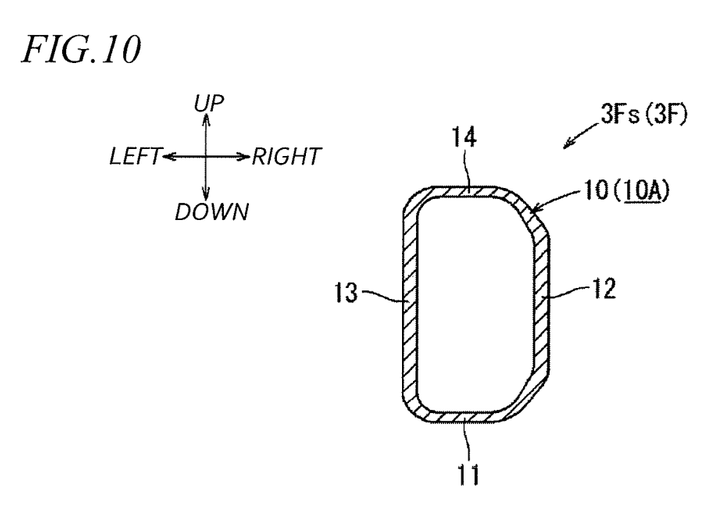
FIG. 10 is a sectional view taken along line X-X shown in FIG. 4.

As above, the opened section frame 20 includes the closure forming part 20A forming a closed sectional shape between the closure forming part 20A and the closed section frame 10 as illustrated in FIGS. 7 to 9, and an opening forming part 20B (front mounting part 24 and rear mounting part 25) forming an opened sectional shape between the opening forming part 20B and the closed section frame 10 as illustrated FIGS. 3 and 6. In addition, as illustrated in FIGS. 2, 3, and 5, in the opened section frame 20, the connection part 20D with which the left end of the rear pipe frame 3Fr is bonded by welding is formed in the rear-end area away from overlapping with the closed section frame 10 in shape. The connection part 20D includes a portion which extends to the rear upper side of the left plate part 23 of the opened section frame 20, and a portion which extends to the rear upper side of the right plate portion 25C of the rear mounting part 25. Such portions are connected with the left end or the outer circumferential surface of the rear pipe frame 3Fr by fitting or abutting.

Summarizing the above, the seat 1 of this embodiment is configured as follows. That is, a vehicle seat (seat 1) includes a seat frame (side frame 3Fs) as a strength member extending in a specific direction (front and rear direction FR). The seat frame includes a closed section frame (closed section frame 10) with a closed sectional shape extending in the specific direction, and an opened section frame (opened section frame 20) with an opened sectional shape extending in the specific direction in parallel with the closed section frame.

The opened section frame includes a closure forming part (closure forming part 20A) forming a closed sectional shape between the closure forming part and the closed section frame, and a gradually changing structure (gradually changing structure 20C), which changes the closed sectional shape formed between the closure forming part and the closed section frame, in the specific direction, and is coupled with the closed section frame.

As described above, when the opened section frame having a high degree of freedom in changing a shape is assembled with the closed section frame having high structure strength in the shape, the section modulus of the seat frame can be changed smoothly in the specific direction. Therefore, since stress concentration hardly occurs even when there is a change in the section modulus of the seat frame, a balance between the structure strength and the weight of the seat frame can be optimized effectively.

The opened section frame (opened section frame 20) includes an opening forming part (opening forming part 20B) forming an opened sectional shape between the opening forming part and the closed section frame in an area where the opened section frame is overlapped with the closed section frame (closed section frame 10) in the specific direction (front and rear direction FR). With such a configuration, another member (slide rail 4) can be simply mounted in the opening forming part formed in the area where the opened section frame and the closed section frame of the seat frame (side frame 3Fs) are overlapped in the specific direction.

The seat frame is configured as a main frame (side frame 3Fs) forming a main framework (cushion frame 3F) along the outer circumferential portion of the seat. The specific direction (front and rear direction FR) is set to a length direction in which the main frame extends. With such a configuration, the framework strength of the vehicle seat (seat 1) can be improved effectively, and the weight of the entire framework can be reduced effectively.

The seat frame is configured as a side frame (side frame 3Fs) forming the framework of the side portion of the seat, and the specific direction (front and rear direction FR) is set to the length direction in which the side frame extends. With such a configuration, a balance between the structure strength and the weight of the side frame including an area where the load received from the seating person is largely applied in a focal manner as a moment load around a shaft in a seat width direction can be optimized effectively.

The opened section frame (opened section frame 20) is assembled from the seat back side (lower side) with the closed section frame (closed section frame 10) so as to form a closure forming part (closure forming part 20A) on the seat back side. With such a configuration, the opened section frame can be provided in the state of being advantageously assembled with a separate member (slide rail 4) provided on the seat back side of the seat frame (side frame 3Fs).

The closed section frame (closed section frame 10) has a shape of extending in a constant closed sectional shape in the specific direction (front and rear direction FR). With such a configuration, a balance between the structure strength and the weight of the seat frame (side frame 3Fs) can be optimized effectively with a simple configuration in which the opened section frame (opened section frame 20) is assembled with the closed section frame having a constant closed sectional shape.

The opened section frame (opened section frame 20) includes a connection part (connection part 20D) connected with another frame (rear pipe frame 3Fr) on an area away from overlapping with the closed section frame (closed section frame 10) in the specific direction (front and rear direction FR). With such a configuration, the seat frame (side frame 3Fs) can be simply mounted in another frame.

Hereinbefore, the description has been given by using the embodiment of the present disclosure as one example, but in addition to the first embodiment, the present invention may be carried out in various embodiments. For example, the configuration of the vehicle seat according to the present invention may be applied to another seat of the automobile in addition to the rear-side seat, and may be widely applied to a vehicle such as a rail in addition to the automobile and a seat used in other vehicles such as an airplane and a ship. Further, the configuration of the present invention may be applied to a separate seat for one person in addition to the bench seat for a plurality of persons. Further, the configuration of the present invention may be applied to a seat frame forming various seat components such a seat back, a headrest, an armrest, and an ottoman in addition to the seat cushion in the vehicle seat. Further, the configuration of the present invention may be applied to a frame bridged in the seat width direction in addition to the side frame in the seat component.

Figure 11:
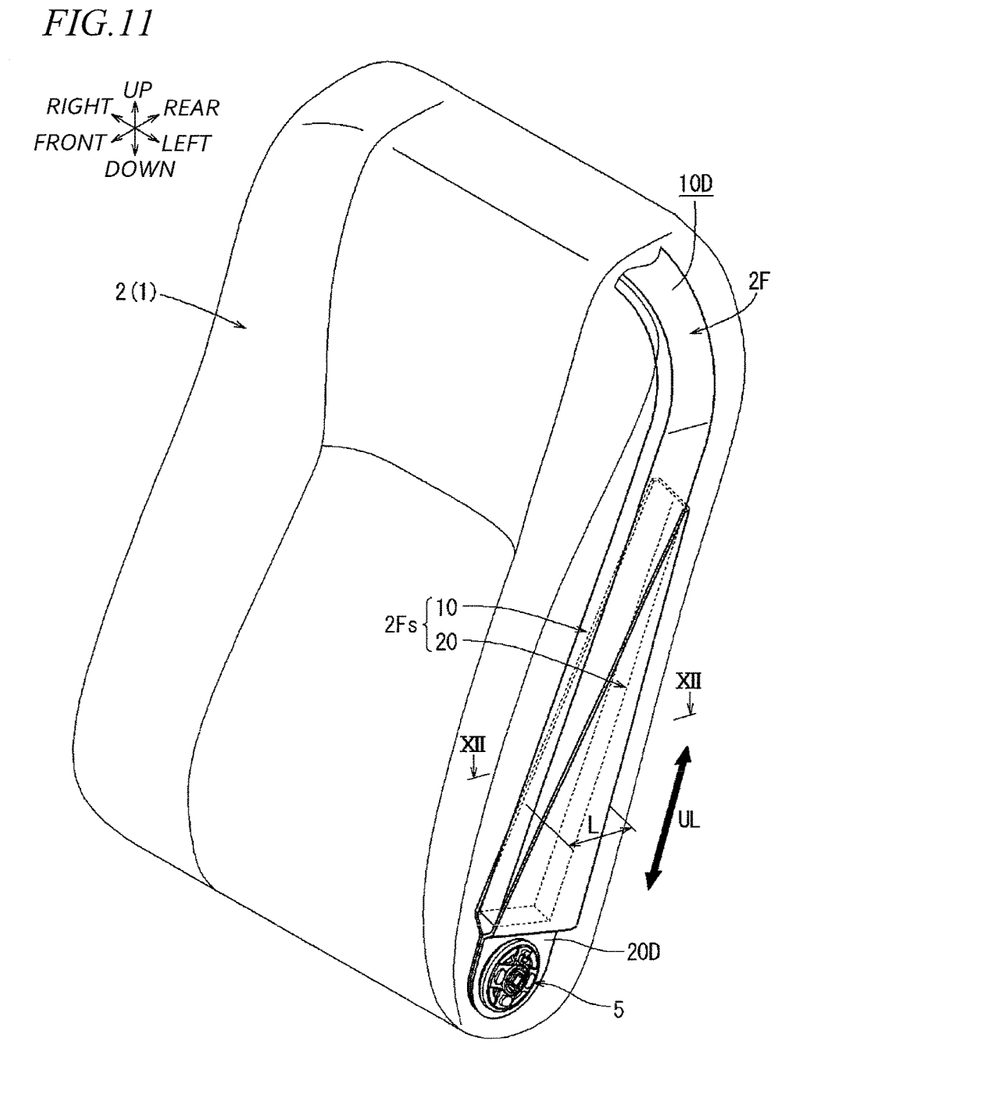
FIG. 11 is a perspective view illustrating a schematic configuration of a vehicle seat according to a second embodiment.
Figure 12:
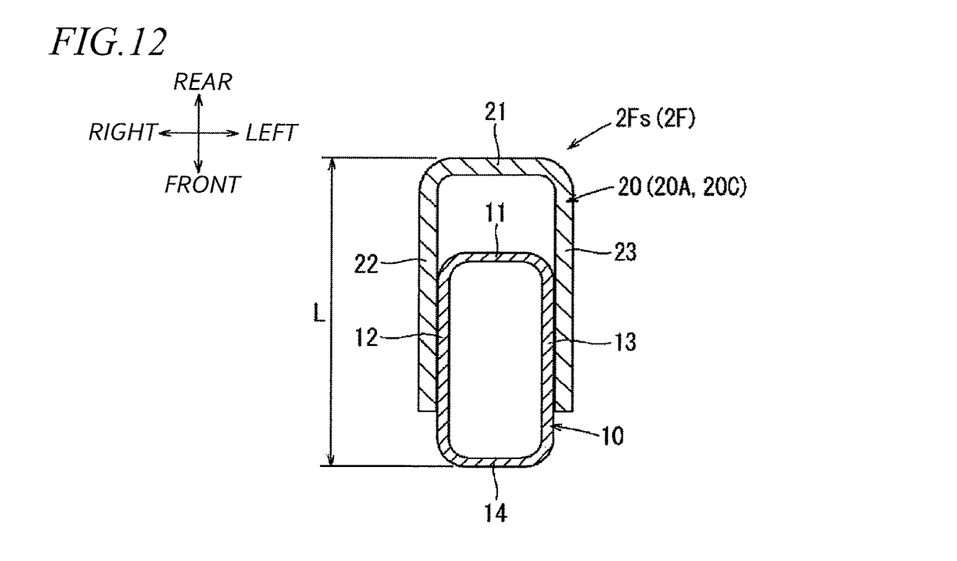
FIG. 12 is a sectional view taken along line XII-XII shown in FIG. 11.

A specific configuration will be given as an example. As illustrated in FIGS. 11 and 12, a side frame 2Fs of the seat back 2 can be configured by assembling the closed section frame 10 and the opened section frame 20 as described in the first embodiment. In the drawings, the same reference numeral denotes each member actually corresponding to the closed section frame 10 and the opened section frame 20 forming the side frame 3Fs (see FIGS. 2 to 5 and the like) of the seat cushion 3 described in the first embodiment.

A simple description will be given about the configuration. In a metal back frame 2F (a main framework along the outer circumferential portion of the seat back 2) forming the inner framework of the seat back 2, the side frame 2Fs (the seat frame and the main frame) forming the inner framework along the left portion of the seat back 2 is configured in such a manner that the rectangular pipe-shaped closed section frame 10, which extends in a long shape in a height direction UL (a specific direction), and an opened section frame 20, which extends in a long shape in the height direction UL in parallel with the closed section frame 10 in the front and rear direction and has a substantially U-shaped sectional shape, are assembled integrally. The upper piece of the back frame 2F is formed by an extension area 10D which extends to be bent to the right side from the upper portion of the closed section frame 10 forming the side frame 2Fs on the left side.

Similarly to the configuration described in the first embodiment, the opened section frame 20 has a substantially U-shaped opened sectional shape. The opened section frame 20 is assembled with the closed section frame 10 from the rear side, and is integrally fastened in plural positions by a rivet (not illustrated). In an area where the closed section frame 10 and the opened section frame 20 in the height direction UL are disposed to be overlapped, the opened section frame 20 has the closure forming part 20A with a U-shaped section which forms the closed sectional shape from the rear side between the closure forming part 20A and the closed section frame 10. Further, the opened section frame 20 has the connection part 20D which extends to the lower side from the closed section frame 10, so that the recliner 5 is integrally coupled with the left portion of the connection part 20D. The connection part 20D is configured such that both the U-shaped side pieces of the closure forming part 20A are overlapped as one piece to be thickened.

The opened section frame 20 and the closed section frame 10 described above are assembled such that the separation distance between the bottom plate parts 21 and 11 directed to the rear side thereof in the front and rear direction is not constant in the height direction UL in which the side frame 2Fs extends, and is changed in each area. With the configuration, a longitudinal width L of the entire side frame 2Fs configured by assembling the opened section frame 20 and the closed section frame 10 is not constant in the height direction UL in which the side frame 2Fs extends, and is changed in each area (gradually changing structure 20C). Hereinbefore, the description has been given about the embodiment illustrated in FIGS. 11 and 12.

The closed section frame is not limited to a substantially rectangular sectional shape, but may be formed in another sectional shape such as a circular shape, an oval shape, and a polygonal shape. The opened section frame is also not limited to the U-shaped sectional shape, but may be formed in another sectional shape such as a V shape and a semicircular shape. The closed section frame or the opened section frame is not limited to one obtained by extrusion-molding or press-molding an aluminum material, but may be one obtained by extrusion-molding, press-molding, or forging a metal material except an aluminum material. In addition, a resin material, FRP, or the like may be used as the material.

The gradually changing structure may be formed by changing the sectional shape of the opened section frame, but may be formed in such a manner that an angle of mounting the opened section frame with respect to the closed section frame is made oblique. The opened section frame is not limited to one which is assembled with the closed section frame from the seat back side, but may be one which is assembled from the surface side or the side of the seat. The closed section frame may have a shape partially having an opened section. Similarly, the opened section frame may have a shape partially having a closed section.

As described in the above with reference to the embodiments, according to a first aspect of the present disclosure, there is provided a vehicle seat including: a seat frame that is provided as a strength member and extends in a specific direction, the seat frame including: a closed section frame having a closed sectional shape and extending in the specific direction, an opened section frame having an opened sectional shape and extending in the specific direction in parallel with the closed section frame, wherein the opened section frame is coupled with the closed section in a state to have a closure forming part and a gradually changing structure, wherein the closure forming part forms a closed sectional shape between the opened section frame and the closed section frame, and wherein the gradually changing structure changes the closed sectional shape formed between the opened section frame and the closed section frame at the closure forming part.

According to the first aspect, when the opened section frame having a high degree of freedom in changing a shape is assembled with the closed section frame having high structure strength in the shape, the section modulus of the seat frame can be changed smoothly in the specific direction. Therefore, since stress concentration hardly occurs even when there is a change in the section modulus of the seat frame, a balance between the structure strength and the weight of the seat frame can be optimized effectively.

According to a second aspect, the opened section frame may have an opening forming part which forms an opened sectional shape between the closed section frame in an area overlapped with the closed section frame in the specific direction.

According to the second aspect, another member can be simply mounted in the opening forming part formed in an area where the opened section frame and the closed section frame of the seat frame are overlapped in the specific direction.

According to a third aspect, the seat frame may be configured as a main frame which forms a main framework along an outer circumferential portion of the seat, wherein the specific direction may be set to a length direction in which the main frame extends.

According to the third aspect, the framework strength of the vehicle seat can be improved effectively, and the weight of the entire framework can be reduced effectively.

According to a fourth aspect, in the vehicle seat of the third aspect, the opened section frame may be assembled with the closed section frame from a seat back side to form the closure forming part on the seat back side.

According to the fourth aspect, the opened section frame can be provided in the state of being advantageously assembled with a separate member provided on the seat back side of the seat frame.

According to a fifth aspect, the seat frame may be configured as a side frame which forms a framework of a side portion of the seat, wherein the specific direction may be set to a length direction in which the side frame extends.

According to the fifth aspect, a balance between the structure strength and the weight of the side frame including an area where the load received from the seating person is largely applied in a focal manner as a moment load around a shaft in a seat width direction can be optimized effectively.

According to a sixth aspect, in the vehicle seat of the fifth aspect, the opened section frame may be assembled with the closed section frame from a seat back side to form the closure forming part on the seat back side.

According to the sixth aspect, the opened section frame can be provided in the state of being advantageously assembled with a separate member provided on the seat back side of the seat frame.

According to a seventh aspect, the closed section frame may have a shape of extending in a constant closed sectional shape in the specific direction.

According to the seventh aspect, a balance between the structure strength and the weight of the seat frame can be optimized effectively with a simple configuration in which the opened section frame is assembled with the closed section frame having a constant closed sectional shape.

According to an eighth aspect, the opened section frame may include a connection part connected with another frame on an area away from overlapping with the closed section frame in the specific direction.

According to the eighth aspect, the seat frame can be simply mounted in another frame.

What is claimed is:

1. A vehicle seat comprising:
   a seat frame that is provided as a strength member and extends in a specific direction, the seat frame including:
   a closed section frame having a closed sectional shape and extending in the specific direction,
   an opened section frame having an opened sectional shape and extending in the specific direction in parallel with the closed section frame,
   wherein the opened section frame is coupled with the closed section in a state to have a closure forming part and a gradually changing structure,
   wherein the closure forming part forms a closed sectional shape between the opened section frame and the closed section frame, and
   wherein the gradually changing structure changes the closed sectional shape formed between the opened section frame and the closed section frame at the closure forming part,
   wherein the open section frame has a first bottom plate,
   wherein the closed section frame has a second bottom plate, and
   wherein the first bottom plate and the second bottom plate are separated from each other by a separation distance in a height direction.

2. The vehicle seat according to claim 1, wherein the opened section frame has an opening forming part which forms an opened sectional shape between the closed section frame in an area overlapped with the closed section frame in the specific direction.

3. The vehicle seat according to claim 1, wherein the seat frame is configured as a main frame which forms a main framework along an outer circumferential portion of the seat, and
   wherein the specific direction is set to a length direction in which the main frame extends.

4. The vehicle seat according to claim 3, wherein the opened section frame is assembled with the closed section frame from a seat back side to form the closure forming part on the seat back side.

5. The vehicle seat according to claim 1, wherein the seat frame is configured as a side frame which forms a framework of a side portion of the seat, and
   wherein the specific direction is set to a length direction in which the side frame extends.

6. The vehicle seat according to claim 5, wherein the opened section frame is assembled with the closed section frame from a seat back side to form the closure forming part on the seat back side.

7. The vehicle seat according to claim 1, wherein the closed section frame has a shape of extending in a constant closed sectional shape in the specific direction.

8. The vehicle seat according to claim 1, wherein the opened section frame includes a connection part connected with another frame on an area away from overlapping with the closed section frame in the specific direction.

9. The vehicle seat according to claim 1, wherein the separation distance between the first bottom plate and the second bottom plate varies along a front/rear direction.

10. The vehicle seat according to claim 1, wherein the closed section frame has a front rising area, a straight area, and a rear rising area, and wherein the second bottom plate extends in the straight area in a front/rear direction, and extends in the front rising area in a direction tilted upwardly relative to the front/rear direction, and
    wherein the first bottom plate part is arranged in the straight area of the closed section frame in a direction tilted and rising in a forward direction, and the first bottom plate is arranged in the front rising area of the closed section frame in a direction of extending in the front /rear direction.

11. The vehicle seat according to claim 1, wherein the closed sectional shape of the closed section is a substantially rectangular shape.

12. A vehicle seat comprising:
    a seat frame that is provided as a strength member and extends in a specific direction, the seat frame including:
    a closed section frame having a closed sectional shape and extending in the specific direction,
    an opened section frame having an opened sectional shape and extending in the specific direction in parallel with the closed section frame,
    wherein the opened section frame is coupled with the closed section in a state to have a closure forming part and a gradually changing structure,
    wherein the closure forming part forms a closed sectional shape between the opened section frame and the closed section frame,
    wherein the gradually changing structure changes the closed sectional shape formed between the opened section frame and the closed section frame at the closure forming part,
    wherein the open section frame has a first bottom plate,
    wherein the closed section frame has a second bottom plate, and
    wherein the first bottom plate and the second bottom plate form an angle oblique in a height direction.

13. The vehicle seat according to claim 12, wherein the opened section frame has an opening forming part which forms an opened sectional shape between the closed section frame in an area overlapped with the closed section frame in the specific direction.

14. The vehicle seat according to claim 12, wherein the seat frame is configured as a main frame which forms a main framework along an outer circumferential portion of the seat, and
    wherein the specific direction is set to a length direction in which the main frame extends.

15. The vehicle seat according to claim 14, wherein the opened section frame is assembled with the closed section frame from a seat back side to form the closure forming part on the seat back side.

16. The vehicle seat according to claim 12, wherein the seat frame is configured as a side frame which forms a framework of a side portion of the seat, and wherein the specific direction is set to a length direction in which the side frame extends.

17. The vehicle seat according to claim 16,
wherein the opened section frame is assembled with the closed section frame from a seat back side to form the closure forming part on the seat back side.

18. The vehicle seat according to claim 12,
wherein the closed section frame has a shape of extending in a constant closed sectional shape in the specific direction.

19. The vehicle seat according to claim 12,
wherein the opened section frame includes a connection part connected with another frame on an area away from overlapping with the closed section frame in the specific direction.

* * * * *